3,063,896
METHODS OF THERAPY EMPLOYING
MAGNESIUM GLUCOHEPTONATE
Francesco Cipelli, Pavia, Italy, assignor to Merck & Co., Inc., Rahway, N.J., a corporation of New Jersey
No Drawing. Filed June 2, 1961, Ser. No. 114,333
3 Claims. (Cl. 167—55)

This invention relates to a new pharmaceutical and clinical employment of a salt, namely, magnesium glucoheptonate. It also relates to a pharmaceutical composition comprising, in unit dosage form, at least 4.0 g. of magnesium glucoheptonate and a pharmaceutical carrier. This invention also relates to a method of treating mammalian digestive tracts which comprises administering to said mammal at least 4.0 g. of magnesium glucoheptonate.

I have found that the magnesium salt of glucoheptonoic acid has unique properties in the treatment of mammalian digestive tracts. This magnesium salt can be used as a cholecystokinetic and as a choleretic, as a laxative or purgative or for prophylactic treatment of dyspeptic conditions tending toward constipation safely without side effects and with a great deal more acceptance by the patients than previous treatments heretofore known.

Glucoheptonic acid has the structure—

$$HOCH_2—(CHOH)_5—COOH$$

It is formed by a Kiliani synthesis on d-glucose which forms a new asymmetric carbon. It can thus exist in two enantiomorphs. The new salt which I have found to possess remarkably useful properties is the magnesium salt of the mixture of these two enantiomorphs, which I refer to as magnesium glucoheptonate throughout these specifications.

In serial X-ray examination of gall bladders, in the past, fatty meals have been used. Such a material has been found by most patients to be unpalatable and bad tasting. Magnesium glucoheptonate is now found to be a much more effective material for such use in that it is much more acceptable to patients and is much more easily tolerated by the patient. Magnesium glucoheptonate induces increased bile flow by physiological means alone: contractions of the gall bladder indeed are accompanied by relaxation of the sphincter of Oddi.

Among the compounds and materials and treatments which have been used prophylactically for laxative or purgative action have been such things as brewer's yeast, mineral oil, suppositories, enemas and diet. Each of these had certain disadvantages. For example, brewer's yeast is bulky and unpalatable, mineral oil is unpalatable. Suppositories are unacceptable to many patients. Enemas are also disliked by most patients and besides are time-consuming and may cause intestinal cramps. The use of diet as a prophylaxis for constipation is difficult to manage in many patients, especially the old and the very young.

In contrast, magnesium glucoheptonate is a pleasant-tasting material which, surprisingly, is usable as a laxative or as a purgative, since the drug is endowed with peristaltic exciting activity in proportion to the dose administered. Most other compounds and materials may be used for only one of these purposes. The more potent and more usual drugs such as phenolphthalein and castor oil may cause severe discomfort such as intestinal cramps and gastric distress. Only at the most severe doses and only occasionally does magnesium glucoheptonate cause any discomfort and then it is only very minor. Magnesium glucoheptonate also brings about an improvement in appetite and a lessening of digestive difficulties and feelings of abdominal tension after meals. All the other substances and treatments heretofore used for laxative or purgative action lack these direct favorable effects.

The dosage of magnesium glucoheptonate must exceed 4 g. in order to obtain the beneficial therapeutic effects. Normally, dosages of approximately 7.5 g., twice a day, are used in acute and chronic affection of the liver and biliary tracts, in hepatopancreatic dyspepsia and habitual or occasional constipation. The dosage of about 12.5 g. has a laxative effect, whereas a dosage of about 25 g. has a purgative one; in serial X-ray examination of the gall bladder are normally employed about 17.5 to 20 g. of magnesium glucoheptonate. The salt is usually administered as a 50% solution in water. Thus, the usual dosage is either 15 or 50 cc. of a 50% solution.

While because of the high solubility in water one can use magnesium glucoheptonate most conveniently as an aqueous solution, water is not the only pharmaceutical carrier which can be used. All kinds of pharmaceutical carriers such as those usually used in making of tablets may be used. The term "pharmaceutical carrier" is also intended to cover gelatin capsules and foods since the magnesium glucoheptonate may be used as a powder to be sprinkled in foods or may be mixed with various forms of sugar, e.g., in candy.

The magnesium glucoheptonate has these pharmacological activities:

It induces an emptying of the gall bladder;
It increases the secretion of bile without changing its glycotamocholate concentration;
It relaxes the Oddi's sphincter;
It increases the enterical peristalsis.

The increased biliary excretion and the effect on intestinal peristalsis are, of course, responsible for the laxative and purgative action.

Magnesium glucoheptonate has a very low acute toxicity. The chronic toxicity is also remarkably low and, indeed, with prolonged treatment, there is no noticeable toxic effect. Histological examination of animals after prolonged treatment shows normal internal organs. Intraperitoneal treatment of pregnant rats during gestation has no effect on the normal birth of normal offspring.

My invention can be illustrated by the following examples:

EXAMPLE 1

Toxicity

Acute toxicity was studied in the white mouse, the rat, guinea pig, and rabbit. The $LD_{50}$ was determined for various routes of administration. For chronic toxicity studies, we used rats which were only a few weeks old. We measured their weight increase for a month, after which we examined their internal organs. Findings relating to acute toxicity are shown in Table I.

The average weight gains have been studied in:

40 rats weighing an average of 28 gm. These were divided into two groups of 20 each. One group received magnesium glucoheptonate intraperitoneally at 20 mg./kg. per day for 34 days. The control group received an equal amount of distilled water.

40 rats weighing an average of 60 gm. These were divided into two groups of 20 each. One group received magnesium glucoheptonate mixed with their food (8%) each day for 30 days.

Following the weight checking period, some of the treated animals were sacrificed. Histological examination showed normal viscera. The remaining animals were observed for two months. They showed no signs of disease, such as changes in liveliness or appetite, nor were any other general effects observed.

The effect of magnesium glucoheptonate was also studied in 10 pregnant rats who received 80 mg./kg. per day intraperitoneally; in all these animals pregnancy continued normally. They bore normal, lively young which developed without showing any somatic changes.

TABLE I.—ACUTE TOXICITY OF MAGNESIUM GLUCOHEPTONATE

| Animal | Route of administration | $LD_{50}$, mg./kc. |
|---|---|---|
| white mouse | intravenous | 630 |
| | intraperitoneal | 2,830 |
| | oral | 21,260 |
| rat | intraperitoneal | 2,780 |
| | oral | 18,170 |
| guinea pig | intravenous | 770 |
| | intraperitoneal | 4,010 |
| rabbit | intravenous | 840 |

EXAMPLE 2

Choleretic Activity

Classic duodenal sounding was done in one group of patients. The three types of bile (A, B and C) were identified. Quantitative evaluation was done of various bile fractions removed after duodenal administration of 25 cc. of 50% magnesium glucoheptonate. Results are shown in Table II.

TABLE II.—BILIARY FRACTIONS REMOVED BY DUODENAL SOUND FOLLOWING ADMINISTRATION OF 25 CC. OF 50% MAGNESIUM GLUCOHEPTONATE INTO THE DUODENUM

| No. of cases | Bile A, cc. | Bile B, cc. | Bile C, cc. |
|---|---|---|---|
| 3 | 55.66±5.37 | 56.66±15.90 | 23.33±3.34 |

EXAMPLE 3

Serial X-ray Examination of Gall Bladders

Magnesium glucoheptonate was given to a group of patients as a cholecystokinetic factor, it being substituted for half of the usual fatty meal of Bronner. Serial X-rays of the gall bladder's contraction were done every 15 minutes for an hour to see whether it would continue contracting for an adequate period of time.

After our preliminary investigations, we set the average dosage at 40 cc.; 50 cc. were occasionally given; while 35 cc. were given to underweight patients.

For this investigation we chose subjects with presumably normal gall bladders, who were thus normally responsive to stimulation, and subjects whose clinical symptoms suggested that they were suffering from gall bladder dysfunction rather than from severe organic changes or gall stones. Results are shown in Table III; figure #1 shows the average volume/time curve.

In view of the definite X-ray findings, we did not think it necessary to do controls in each case by repeating cholecystography after a fatty meal; we did make such control studies with those patients who showed moderate response at dosages lower than 40 to 50 cc. of a 50% magnesium glucoheptonate solution.

In these latter cases, the reaction of the gall bladder to the fatty meal was equal to or slightly greater than that obtained with magnesium glucoheptonate at a dosage lower than the highest one; however, every patient who received both the fatty meal and magnesium glucoheptonate stated explicitly that he preferred magnesium glucoheptonate because of its good taste, better tolerance and easier ingestion.

TABLE III.—CHOLECYSTOKINETIC ACTION OF MAGNESIUM GLUCOHEPTONATE IN RELATION TO DECREASE IN SIZE OF GALL BLADDER

| Number of Cases | Quantity of Drug | Cholecystokinetic response in percent of volume decrease | Time required for initial decrease | Time required for maximal decrease |
|---|---|---|---|---|
| 1 | 50 | 75.8 | 15' | 45' |
| 10 | 40 | 39.24±4.09 | 80%=15'<br>20%=30' | 80%=45'<br>20%=60' |
| 4 | 35 | 39.70±8.99 | 50%=15'<br>50%=30' | 80%=45'<br>10%=60' |

EXAMPLE 4

Peristaltic Action

On the basis of the preliminary observations made during the first studies, two dosages were used, based on body weight; 25 and 50 cc. of 50% magnesium glucoheptonate solution, given in a single dose. It was given to all patients in the evening, slightly warmed, and its effect was observed for the next 24 hours; we watched for subjective symptoms, the frequency and type of bowel movements, and any possible side effects. Ten patients with occasional or habitual constipation received 25 cc. of the drug; they were convalescents or patients whose disease did not involve the digestive tract. Results are seen in Table IV. By way of comment, we note that in those cases where the drug took effect, there were one or more easy, unremarkable bowel movements within 8 to 20 hours after medication, or else there were several bowel movements (2–4) preceded by borborygismus and loose stools.

The identical technique was used for administration of 50 cc. to 10 patients; these had not been chosen for the type of disease from which they suffered, but because they all required a purgative. Results are seen in Table IV.

In those cases where the drug took effect, there were one or more bowel movements. Three patients complained of preceding, moderate and transitory intestinal pain.

In both groups of patients, the peristaltic effect disappeared after a period of time and did not produce later symptoms attributable to poor gastric tolerance. The response was not always proportional to the dosage administered, illustrating importance of individual response to stimulus.

TABLE IV.—ACTION OF MAGNESIUM GLUCOMONOCARBONATE ON INTESTINAL PERISTALSIS

| Number of Cases | Amount of 50% Solution, cc. | None | Effect Laxative | Purgative |
|---|---|---|---|---|
| 10 | 25 | 4 | 5 | 1 |
| 10 | 50 | 2 | 1 | 7 |

EXAMPLE 5

Therapeutic Activity in Certain Acute and Chronic Conditions of the Liver and the Biliary Tract We did not analyze the possible therapeutic effect of the drug on the underlying disease process but observed its immediate effect on the essentially subjective symptoms of dyspeptic conditions. Therefore, the acute or chronic liver conditions selected by us had as common denominator the dyspeptic syndrome. These patients received a tablespoon of magnesium glucoheptonate solution (50%) after the principal meals; this did not have a particularly stimulating effect on intestinal peristalsis, but did result in gradual improvement in cases which showed a tendency towards constipation. Results are shown in Table V. It must be noted that all patients reported improvement in appetite and a marked lessening of digestive difficulties and of feelings of abdominal tension after meals.

TABLE V.—THERAPEUTIC ACTIVITY OF MAGNESIUM GLUCOHEPTONATE ON DYSPEPSIA IN CERTAIN FORMS OF LIVER DISEASE

| Disease | Cases | Negative | Results Good | Optimal |
|---|---|---|---|---|
| chronic hepatitis | 6 | | 4 | 2 |
| chronic hepatobiliary disease | 4 | | 1 | 3 |
| acute hepatitis | 2 | | 1 | 1 |
| allergic hepatitis | 1 | | | 1 |
| Total | 13 | | 6 | 7 |

EXAMPLE 6

Preparation of Magnesium Glucoheptonate

Five liters of a filtered aqueous solution containing 200 g. of anhydrous calcium chloride and 163 g. of sodium cyanide is used to dissolved 540 g. of anhydrous glucose at 20° C. The temperature of the solution rises to 33° C. within an hour. After 24 hours, the formation of glucoheptonic nitriles and their hydrolysis to the mixture of isomeric calcium glucoheptonates and ammonia is complete. Magnesium hydroxide (193 g.) is then added to the solution. In a short while the magnesium salt precipitates. This is filtered and washed with cold lime water until the filtrate is chloride free.

I claim:
1. A method of treating mammalian digestive tracts which comprises administering to the said mammal at least 4.0 g. of magnesium glucoheptonate.
2. The method of claim 1 in which a compound is administered orally.
3. The method of claim 1 in which the said compound is in aqueous solution.

References Cited in the file of this patent

FOREIGN PATENTS 1,074,939    France _____ Apr. 7, 1954